United States Patent [19]

Ochi et al.

[11] Patent Number: 4,472,201

[45] Date of Patent: Sep. 18, 1984

[54] HYDRAULIC HEAT-RESISTING MATERIAL AND PREMOLD PRODUCT MADE OF SUCH HYDRAULIC HEAT-RESISTING MATERIAL

[75] Inventors: Yoshiyuki Ochi; Yoshihiko Uchida; Yutaka Ohnishi; Kotaro Kuroda; Yutaka Shibata, all of Kitakyushu, Japan

[73] Assignee: Kurosaki Refractories Co., Ltd., Kitakyushu, Japan

[21] Appl. No.: 407,343

[22] Filed: Aug. 12, 1982

[30] Foreign Application Priority Data

| Aug. 15, 1981 | [JP] | Japan | 56-127903 |
| Aug. 15, 1981 | [JP] | Japan | 56-127904 |
| Aug. 15, 1981 | [JP] | Japan | 56-127905 |
| Aug. 15, 1981 | [JP] | Japan | 56-127906 |

[51] Int. Cl.³ .............................................. C04B 7/35
[52] U.S. Cl. .................................................. 106/98
[58] Field of Search ...................................... 106/98

[56] References Cited

U.S. PATENT DOCUMENTS

| 2,410,954 | 11/1946 | Sharp | 106/98 |
| 3,754,954 | 8/1973 | Gabriel et al. | 106/98 |
| 3,880,664 | 4/1975 | Schulze | 106/98 |
| 3,969,567 | 7/1976 | Occleshaw et al. | 106/98 |
| 4,118,242 | 10/1978 | Kjohl et al. | 106/98 |
| 4,255,195 | 3/1981 | Holter et al. | 106/98 |
| 4,310,486 | 1/1982 | Cornwell et al. | 106/98 |

*Primary Examiner*—James Poer
*Attorney, Agent, or Firm*—James J. Ralabate

[57] ABSTRACT

Hydraulic heat-resisting material of an improved thermal property which has high strength and high volume stability under high temperature is disclosed. The material substantially consists of 5 to 70 parts by weight of a mixture, the mixture consisting of 49.95 to 87.3% by weight of hydraulic cement, 49.95 to 9.7% by weight of amorphous silica and 0.1 to 3% by weight of a dispersing agent, and 95 to 30 parts by weight of a heat-resisting aggregate. Premold product made of the above material is also disclosed.

2 Claims, No Drawings

HYDRAULIC HEAT-RESISTING MATERIAL AND PREMOLD PRODUCT MADE OF SUCH HYDRAULIC HEAT-RESISTING MATERIAL

BACKGROUND OF THE INVENTION

This invention relates to a hydraulic heat-resisting material and a premold product which uses the hydraulic cement as a binder, more particularly to a hydraulic heat-resisting material and a premold product of an improved thermal property which show a high strength and high volume stability under high temperature.

Castable refractories have been widely used for furnaces of various industries due to its readiness in furnace constructing engineering, its easy handling in application and its contribution to the man-power saving.

Generally, such castable refractories substantially consists of a heat-resisting aggregate and a binder, wherein the aluminous cement has been widely used as the binder due to its early high-strength and high heat-resistance.

However, such aluminous cement has following defects, namely, (i) the cement sharply decreases the strength thereof at a low temperature zone due to the change of crystal structure, and (ii) the cement is extremely expensive. Therefore, the aluminous cement has not been used for a general purpose or use.

The present invention has started from the idea to employ the hydraulic cement as a binder for the castable refractories instead of the aluminous cement which have the above-mentioned defects. The hydraulic cement has been used exclusively as a binder of a concrete for civil and architectural engineering.

However, the hydraulic cement contains $3CaO.SiO_2$, $2CaO.SiO_2$ as the main components thereof.

These components produce a considerable amount of free calcium hydroxide besides the hydrate of the calcium silicate due to the hydration. This free calcium carbonate reacts with the carbon dioxide in the air to produce the calcium carbonate. This reaction increases the speed thereof along with the temperature elevation, and the calcium carbonate is subjected to the decarboxylation above 600° C. to produce the calcium oxide. Meanwhile, the calcium hydroxide is subjected to the dehydration above 450° C. to produce calcium oxide. The calcium oxide produced in the above manner, when being cooled, reacts with the water in the air to produce calcium hydroxide. These chemical reactions provide a physical reaction simultaneously. Namely, the calcium carbonate which was produced by the carbonation of the calcium hydroxide has a high specific gravity and such calcium carbonate is produced with gaps around constituent grains thereof so that the structure thereof is weakened resulting in the poor strength thereof. Furthermore, although the hydration of the calcium oxide produces the calcium hydroxide which has a low specific gravity, such calcium hydroxide provides the expansion thereof and the cracks therein also resulting in the weakening of the structure and the poor strength. These defects of the hydraulic cement has hampered the utilization of the hydraulic cement as a binder of the heat-resisting material.

The inventors have made an extensive research to produce a hydraulic heat-resisting material which can be produced cheaply and has high strength and high volume stability by improving such defects of the hydraulic cement. It has been already known that the above-mentioned defects of the hydraulic cement, e.g. portland cement are derived from the free calcium hydroxide which is produced by the hydration and that several methods are proposed to prevent the ill-effects of the free calcium hydroxide. In concrete industries, one method proposed the addition of various admixing agents, such as soluble terra, fly ash, blast furnace slag to the free calcium hydroxide. However, all these admixing agents reacts very slowly in a long period. Therefore, although the agents may be used in the production of the concrete, they are not suitable for the production of the heat-resisting material where the period from the completion of the casting to the actual servicing is extremely short.

The inventors have further continued the research to improve the reaction speed of an admixing agent with the free calcium hydroxide and have noticed the surface activity and the grain size of the silica particles or grains, and finally, have found out that the ultra-fine amorphous silica could provide the remarkable effect to improve the reaction speed. It was also found that the use of 9.7 to 49.95% by weight of the ultra-fine amorphous silica relative to the 87.3 to 49.95% by weight of the hydraulic cement is most effective. The present invention is completed based on this finding.

The present invention relates to a hydraulic heat-resisting material of early high-strength which consists of 5 to 70 parts by weight of mixture, the mixture being made of 49.95 to 87.3% by weight of the hydraulic cement, 49.95 to 9.7% by weight of ultra-fine amorphous silica and 0.1 to 3% by weight of a dispersing agent, and 95 to 30 parts by weight of the heat-resisting aggregate.

As the hydraulic cement which can be used in the present invention, the portland cement, the blast furnace cement, the fly ash cement, the acidproof cement are considered.

As the ultra-fine amorphous silica, as a primary particulate, the amorphous silica having the particle size of 0.01 to 3μ is most preferable. The amount of the amorphous silica should be 9.7 to 49.95% by weight and preferably be 14.55 to 39.96% by weight relative to 49.95 to 87.3% by weight of the hydraulic cement. When the amount of amorphous silica is less than 9.7% by weight, the reaction-speed improving effect is decreased, while when the amount exceeds 49.95% by weight, although the reaction-speed improving effect is maintained, the firing shrinkage increases thereby the volume stability is worsened.

In the structure of a castable refractories using the cement, the cement are generally not dispersed uniformly and the major portion of the cement are segregated in the structure forming granulates having the size of about 40 to 60μ. This implies that the cement are not effectively utilized in the structure. To promote the utilization of the cement, if the cement is dispersed uniformly in the structure in a condition of primary particulates, the refractories can obtain the strength greater than the strength of conventional refractories even when the amount of the cement added is small. The dispersing agent of this invention is used for the above dispersion of the cement. As the dispersing agent, the alkali metal salt or the ammonium salt of the alkylsulfonic acid, and the alkali metal or the ammonium salt of the alkylarylsulfonic acid are considered.

The addition amount of the dispersing agent should be 0.1 to 3 parts by weight relative to 49.95% to 87.3% by weight of the cement. When the amount is less than 0.1% by weight, the cement suffers a poor dispersing property and an anhydration, while when the amount is more than 3% by weight, depending on a kind of the dispersing agent, the dispersing property and the anhydration both decrease or although the dispersing and the anhydrating effects are maintained at favorable levels, the dispersing agent becomes expensive and provides an ill-effect on the quality of the heat-resisting material. In the present invention, the addition of the dispersing agent disperses the hydraulic cement uniformly so that the cement necessary for the production of the heat-resisting material can be minimized. Simultaneously, due to the anhydrating effect, the cement water ratio can be lowered whereby the heat-resistance, the volume stability and the strength of the matrix can be greatly improved.

Furthermore, this dispersing agent can sufficiently disperse the co-existing ultra-fine amorphous silica so as to make the silica as carriers of the cement particles, whereby the dispersion and the anhydration of the cement are further enhanced.

The heat-resisting material of the present invention includes the heat-resisting aggregate besides the mixture of the above-mentioned hydraulic cement, the ultra-fine amorphous silica and the dispersing agent.

As the heat-resisting aggregate, agalmatolite, chammotte, sillimanite, kyanite, andalusite, synthetic mullite, bauxite, fired alumina shale, fired alumina, electrofused alumina, silicon carbide, silicon nitride, zircon, zirconia, magnesia, spinel, lime-stone, green dolomite, forsterite, chromite, sandstone, shale, basalt, andesite, rhyolite, granite, diorite, serpentine, slate, gravels, sea sand, river sand, mountain sand are considered.

Although the composition ratio between this heat-resisting aggregate and the mixture consisting of the hydraulic cement, the ultra-fine amorphous silica and the dispersing agent is preferably chosen to provide a desired strength and heat-resistance to the hydraulic heat-resisting material, such ratio should be 5 to 70 parts by weight:30 to 90 parts by weight. When the amount of the mixture is less than 5 parts by weight, the material lowers the strength thereof, while the amount of the mixture exceeds 70 parts by weight, the material lowers the heat-resistance and the volume stability.

Besides the above-mentioned hydraulic cement, the ultra-fine amorphous silica and the dispersing agent, the material of the present invention may include a shrinkage restricting agent for providing the effect of an expansion cement, and a lightweight aggregate such as a alumina balloon, "silasu" balloon (volcanic ash) or pumice or a foamed material such as a foamed styrol or a foamed polyethylene for providing the effect of a heat-insulating cement. Furthermore, the material of the present invention may include steel fiber, stainless steel fiber, glass fiber, ceramic fiber, carbon fiber, alumina fiber which are usually used to increase the strength of the material. Still furthermore, for providing the explosion-resistance at the stage of drying, the material of the present invention may contain metal aluminium or metal silicon as an exothermic material. Still furthermore, the material of the present invention may contain organic fiber or inorganic fiber to increase the heat-insulating effect and the strength of the material.

The manner in which the material of the present invention is used, for example for furnace construction is hereinafter disclosed.

A desired amount of water is added in the material of the present invention which has the above composition and the mixture is applied to furnace lining in the same manner as the conventional concrete or castable refractories, namely by gravity casting, by vibration casting, by vibration molding, by spraying, by injection, by troweling, by slinging, or by ramming. The material may also be applied such that the material is mixed with water to produce a mixture, the mixture is then cast in a mold having a desired shape and size by making use of any one of the methods described above, and after being hardened, a block is removed from the mold and is subjected to an air curing, a steam curing or drying to produce a premold product. It may be possible that after mixing the material of the present invention with water, a mixture is subjected to an extrusion molding and an ensuing press molding to be formed into a desired shape and then is subjected to a natural curing, a steam curing and a heat-drying to produce an unburned brick.

Besides the above uses, the material of the present invention can be used to produce following means or devices all of which belong to the iron and steel industry.

(i) blast furnace
foundation, shaft, heat-proof plate, circular tube, cast house, trough cover, floor of slag processing plant, partition (ii) hot blast store
foundation, tuyere, hot blast tube (iii) coke oven
foundation, main chimney, door, cooling chamber of coke-wharf-dry-quenching chamber, upper deck of coke oven, coke guide car (iv) converter
heat-proof plate, COG duct (v) others
working floor of mold yard, runner, brick fastener, ingot transport car, foundation of continuous casting machine, foundation of heat treatment furnace such as soaking pit, annealing furnace, inner lining, outer lining, chimney, working floor of strip mill.

Furthermore, the material of this invention is applicable to the similar places or equipments in non-ferrous metal industry and chemical industry, cement industry, or ceramics industry. Still furthermore, the material is applicable to incinerators, nuclear reactor, rocket launch complex or the foundation of various buildings which are conventionally made of cement. The material can also be used in any field with a temperature ranging from 20° to 130° C.

The present invention is further explained in detail in view of the following examples. However, it must be noted that the scope of the present invention is, in no way, restricted by the examples.

EXAMPLE 1

80% by weight of normal portland cement, 20% by weight of amorphous silica flour and 1% by weight of sodium of alkylarylsulfonic acid are mixed to produce mixture 1. This mixture 1 was mixed with chammotte used as an aggregate along with the addition of water to produce the materials (1), (2) of the present invention. The composition of the materials (1), (2) are shown in Table 1. As a control (1), the composition of a conventional material containing alumiouns cement is shown.

TABLE 1

| composition | material (1) (parts by weight) | material (2) (parts by weight) | control (1) (parts by weight) |
|---|---|---|---|
| chammotte (5-1 mm) | 45 | 45 | 45 |
| chammotte (less than 1 mm) | 20 | 20 | 20 |
| chammotte (less than 0.21 mm) | 25 | 20 | 20 |
| mixture 1 | 10 | 15 | — |
| aluminous cement | — | — | 15 |
| water | 10.8 | 10.5 | 11.0 |

The above materials (1), (2) and the control (1) were subjected to the measurement of bending strength, compression strength, bulk density, linear shrinkage. The result of the measurement is shown in Table 2.

TABLE 2

| | material (1) | material (2) | control (1) |
|---|---|---|---|
| bending strength at 160° C. × 24 hours (kg/cm$^2$) | 65 | 80 | 60 |
| compression strength (kg/cm$^2$) | 250 | 350 | 24.0 |
| bulk density | 2.16 | 2.15 | 2.20 |
| linear shrinkage (%) | −0.10 | −0.12 | −0.10 |
| bending strength at 800° C. × 3 hours (kg/cm$^2$) | 52 | 64 | 42 |
| compression strength (kg/cm$^2$) | 200 | 290 | 160 |
| bulk density | 2.10 | 2.11 | 2.09 |
| linear shrinkage (%) | −0.25 | −0.28 | −0.23 |
| bending strength at 1300° C. × 3 hours (kg/cm$^2$) | 75 | 95 | 78 |
| compression strength (kg/cm$^2$) | 320 | 450 | 350 |
| bulk density | 2.20 | 2.25 | 2.24 |
| linear shrinkage (%) | −0.75 | −1.55 | −0.85 |

EXAMPLE 2

69% by weight of normal portland cement, 29.5% by weight of amorphous silica flour and 1.5% by weight of "Mighty 100" (a dispersing agent produced by Kao Soap Co., Ltd.) were mixed to produce a mixture 2. This mixture 2 and silicious stone, sea sand and fly ash which are used as an aggregate are mixed along with water to produce a material (3) of the present invention. The composition of the material (3) is shown in Table 3. As a control (2), the composition of a conventional material which contains portland cement instead of the above mixture 2 is shown.

TABLE 3

| composition | material (3) (parts by weight) | control (2) (parts by weight) |
|---|---|---|
| silicious stone (25-5 mm) | 50 | 50 |
| sea sand (1.2 mm) | 36 | 36 |
| fly ash | 4 | |
| mixture 2 | 10 | |
| portland cement | | 14 |
| water | 10.5 | 11.0 |

The above material (3) of the present invention and the control (2) were subjected to the measurement of the slump value, the compression strength and the presence of slaking. The result of the measurement is shown in Table 4.

TABLE 4

| | material (3) | control (2) |
|---|---|---|
| slump value (cm) | 10 | 10 |
| compression strength (kg/cm$^2$) | | |
| at 20° C. × 14 days | 250 | 180 |
| at 110° C. × 24 hours | 370 | 250 |
| at 300° C. × 20 hours | 400 | 220 |
| at 500° C. × 20 hours | 180 | 110 |
| slaking | not occurred | large slaking occurred |

The above slaking test was conducted such that the material which was processed at 500° C. was held in a constant moistened room for 7 days at a humidity of 90% and a temperature of 20° C. and the presence of the slaking was observed.

EXAMPLE 3

The mixture 2 which was prepared in the same manner as in the Example 2 was mixed with blast furnace slag and fly ash which are used as an aggregate along with water to produce materials (4), (5) of the present invention. The composition of the materials (4), (5) is shown in Table 5.

TABLE 5

| composition | material (4) (parts by weight) | material (5) (parts by weight) |
|---|---|---|
| blast furnace slag (25-5 mm) | 50 | 50 |
| blast furnace slag (less than 1.2 mm) | 36 | 36 |
| blast furnace slag (less than 0.2 mm) | 4 | |
| fly ash | | 4 |
| mixture 2 | 10 | 10 |
| water | 10.8 | 10.4 |

The materials (4) and (5) are subjected to the measurement of slump value and the compression strength. The result of the measurement is shown in Table 6.

TABLE 6

| compression strength (kg/cm$^2$) | material (4) | material (5) |
|---|---|---|
| at 20° C. × 14 days | 240 | 240 |
| at 110° C. × 24 hours | 470 | 480 |
| at 200° C. × 20 hours | 550 | 560 |

EXAMPLE 4

70% by weight of normal portland cement, 30% by weight of amorphous silica flour and "Mighty 100" (a dispersing agent of Kao Soap Co., Ltd.) were mixed.

This mixture 3 and chammotte used as an aggregate were mixed along with water to produce a material (6) of this invention. Table 7 shows the composition and the physical properties of the material (6). Two controls (3), (4) were prepared by using alumina cement and portland cement respectively instead of the mixture 3. The composition and physical properties of these controls (3), (4) are also shown in Table 7.

TABLE 7

|  | material (6) | control (3) | control (4) |
| --- | --- | --- | --- |
| chammotte (25-5 mm) | 50 | 50 | 50 |
| chammotte (less than 1 mm) fly ash 4 | 36 | 36 | 36 |
| mixture 3 | 10 |  |  |
| normal portland cement |  | 14 |  |
| alumina cement |  |  | 14 |
| water | 11.5 | 12.5 | 13.0 |
| slump value (cm) | 10 | 10 | 10 |
| compression strength ($kg/cm^2$) |  |  |  |
| at 20° C. × 14 days | 220 | 150 | 220 |
| at 110° C. × 24 hours | 340 | 240 | 200 |
| at 300° C. × 20 hours | 500 | 200 | 160 |
| at 500° C. × 20 hours | 400 | 110 | 180 |
| at 800° C. × 20 hours | 330 | 100 | 150 |

The material (6) of this invention and the controls (3), (4) were respectively casted in molds to be formed into blocks. These blocks were cured for 7 days at a room temperature and subsequently subjected to a heating at 800° C. for 24 hours. Although no cracks were observed on either blocks right after the heating, when they were subjected to a slaking test at a temperature of 20° C. and a humidity of 90%, a large crack was observed on the control (3).

Besides the above disclosure of the present invention (hereinafter referred to as "first embodiment"), following embodiments are also considered as to the hydraulic heat-resisting material of the present invention.

SECOND PREFERRED EMBODIMENT

This embodiment relates to a hydraulic heat-resisting material which uses a hydraulic cement as a binder thereof and a premold product made of such material, wherein the material and the product are characterized by including fiber for reinforcing the strength of the material and the product.

The hydraulic heat-resisting material of this embodiment substantially consists of (i) 5 to 70 parts by weight of a mixture consisting of 49.95 to 87.3% by weight of hydraulic cement, 49.95 to 9.7% by weight of ultra-fine amorphous silica and 0.1 to 3% by weight of a dispersing agent, (ii) 30 to 95 parts by weight of heat-resisting aggregate and (iii) 0.1 to 30 parts by weight of a fiber material.

In the above composition, the hydraulic cement, the ultra-fine amorphous silica, the dispersing agent and the heat-resisting aggregate are the same materials as listed in view of the first preferred embodiment.

As the fiber material, organic natural fiber, inorganic natural fiber, organic synthetic fiber, steel fiber, stainless steel fiber, ceramic fiber, slag fiber, carbon fiber, silicon carbide fiber, glass fiber are considered. Although organic natural fiber has the lower heat-registance than the inorganic natural fiber, organic fiber is effective in the improvement of toughness. Organic synthetic fiber includes polyethylene fiber, polyamide synthetic fiber, polypropylene fiber, polyester fiber and polyvinyl fiber. Since these fibers have low fusion points, the allowable service temperature of the material containing such fibers is to be restricted. However, the use of these organic synthetic fibers provides an extremely high toughness to the materials of the present invention which other fibers cannot provide.

Inorganic natural fiber may be represented by the asbestos. The material reinforced with asbestos can have the high bending strength.

As reinforcing fibers, the steel fiber and the stainless steel fiber are most popularly used. The use of steel fiber including the stainless steel fiber can remarkably improve the crack-resistance, the deformation-resistance, shearing strength, the erosion-resistance of the material.

Although slag fiber has a low tensile strength, the fiber is relatively inexpensive and can provide the high heat-resistance to the material.

Since carbon fiber has the high elasticity, the material reinforced with this fiber shows an extremely high bending strength.

As ceramic fiber, alumina-silica fiber, aluminous fiber, zirconia fiber are considered. These ceramic fibers show the high heat-resistance comparable to the silicon carbide fibers. The material reinforced with the glass fiber shows the high crack-resistance.

Generally the application of the glass fiber has a problem that the glass is eroded by the alkali of the cement. To resolve this problem, a considerable amount of zirconia is to be added to the glass composition, or the glass fiber of ordinary composition has to be coated with the synthetic resin on the surface thereof. Since the material of this invention shows a little erosion to glass fiber, not only glass fiber provided with the alkali-resisting treatment but also glass fiber of ordinary composition which are considerably cheaper than the above glass fiber are also applicable.

In producing a premold product of this invention, these fiber materials are mixed with the above-mentioned heat-resisting aggregate, the hydraulic cement, the ultra-fine amorphous silica and the mixture is filled in a mold of a desired shape and size by a suitable method, e.g. by gravity casting, by vibration casting, by vibration molding, by spraying, by injection, by troweling or ramming. When a premold product is of a pipe-shape, the mixture may be rotated at high speed to effect a centrifugal molding. After the mixture is sufficiently hardened, a premold product is removed from the mold. Such premold product is, then, cured to produce a finished product. In the above premold product, since the free lime is captured by the ultra-fine silica even by the natural curing, a steam curing or a curing with an autoclave can be unnecessitated.

The material and the premold product of this embodiment find their uses or applications in the same industrial fields of the first embodiment. This embodiment is further explained in view of following examples.

EXAMPLE 5

79% by weight of ordinary portland cement, 20% by weight of amorphous silica flour and 1% by weight of alkylarylsulfonic acid sodium were mixed. 15 parts by weight of this mixture (4), 85 parts by weight of chammotte having the particle size of less than 5 mm and 5 parts by weight of steel fiber were mixed along with water to produce a material (7) of this embodiment. For a comparison purpose, a control (5) was produced by mixing 15 parts by weight of aluminous cement, 85 parts by weight of chammotte having the particle size of less than 5 mm, 5 parts by weight of steel fiber and 12 parts by weight of water.

The material (7) and the control (5) were both subjected to the measurement of bending strength, the compression strength, the bulk specific gravity and the linear shrinkage and the result thereof is shown in Table 8 and the type of steel fiber is shown in Table 9.

TABLE 8

| | material (7) | control (5) |
|---|---|---|
| bending strength at 160° C. × 24 hours (kg/cm$^2$) | 86 | 62 |
| compression strength (kg/cm$^2$) | 330 | 235 |
| bulk density | 2.20 | 2.22 |
| linear shrinkage (%) | −0.08 | −0.08 |
| bending strength at 800° C. × 3 hours (kg/cm$^2$) | 75 | 47 |
| compression strength (kg/cm$^2$) | 266 | 155 |
| bulk density | 2.15 | 2.10 |
| linear shrinkage (%) | −0.20 | −0.18 |
| bending strength at 1300° C. × 3 hours (kg/cm$^2$) | 113 | 84 |
| compression strength (kg/cm$^2$) | 510 | 361 |
| bulk density | 2.26 | 2.24 |
| linear shrinkage (%) | −1.20 | −0.75 |

TABLE 9

| size | shape | material |
|---|---|---|
| 0.5 × 0.5 × 30 mm | corrugated | galvanized sheet steel |

EXAMPLE 6

69% by weight of normal portland cement, 29.5% by weight of amorphous silica flour, 1.5% by weight of "Mighty 100" (a dispersing agent produced by Kao Soap Co., Ltd.) were mixed. 10 parts by weight of this mixture (5), 50 parts by weight of silicious stone having the particle size of 5 to 25 mm, 36 parts by weight of sea sand having the particle size of less than 1.2 mm, 4 parts by weight of fly ash, and 5 parts by weight of steel fiber used in Example 5 were mixed along with 11 parts by weight of water to produce a material (8) of this embodiment. For a comparison purpose, a control (6) was prepared by mixing 50 parts by weight of silicious stone having the particle size of 5 to 25 mm, 36 parts by weight of sea sand having the particle size of 1.2 mm, 14 parts by weight of portland cement, 5 parts by weight of steel fiber used in Example 5 and 12 parts by weight of water.

The above material (8) and the control (6) were subjected to the measurement of slump value, compression strength and slaking. The result of the measurement is shown in Table 10.

TABLE 10

| | material (8) | control (6) |
|---|---|---|
| slump value (cm) | 4 | 4 |
| compression strength (kg/cm$^2$) | | |
| at 20° C. × 14 days | 230 | 170 |
| at 110° C. × 24 hours | 340 | 235 |
| at 300° C. × 20 hours | 370 | 200 |
| at 500° C. × 20 hours | 170 | 90 |
| slaking | not occurred | large slaking occurred |

Slaking was observed after holding the product processed at 500° C. in an air-conditioned room for 7 days.

EXAMPLE 7

69% by weight of normal portland cement, 29.5% by weight of amorphous silica flour and 1.5% by weight of "Mighty 100" (a dispersing agent produced by Kao Soap Co., Ltd.) were mixed. 10 parts by weight of this mixture (6), 86 parts by weight of chammotte having the particle size of less than 5 mm, 4 parts by weight of fly ash, 5 parts by weight of steel fiber and 11 parts by weight of water were mixed to produce a material (9) of this embodiment. For a comparison purpose, a control (7) was prepared by mixing 14 parts by weight of normal portland cement and 86 parts by weight of chammotte having the particle size of less than 5 mm with 11.5 parts by weight of water addition. Another control (8) was prepared by mixing 14 parts by weight of normal portland cement, 86 parts by weight of chammotte having the particle size of less than 5 mm and 5 parts of the steel fiber with 12 parts by weight of water addition. The material (9) and controls (7) and (8) were subjected to a spalling resistance test. In the test, test pieces, each of which has a shape of 230×120×65 mm, were dried at 110° C. for 24 hours, and then one third of each test piece was inserted in an electric furnace which held the inner temperature thereof at 1200° C. After heating the test piece for 15 minutes, the test piece was drawn out from the furnace and cooled in the air. This process was repeated 10 times and the occurrence of cracks and peel-off during the repetition was observed. The result of the test is shown in Table 11.

TABLE 11

| | Material (9) | Control (7) | Control (8) |
|---|---|---|---|
| Number of cracks | 2 | 1 | 2 |
| Size of cracks | small | large | small |
| Number of peel-off | not occurred | 4 | 9 |

EXAMPLE 8

69% by weight of normal portland cement, 29.5% by weight of amorphous silica flour, and 1.5% by weight of "Mighty 100" (a dispersing agent of Kao Soap Co., Ltd.) were mixed. 10 parts by weight of this mixture (7), 86 parts by weight of chammotte having the particle size of less than 5 mm, 4 parts by weight of fly ash and 4 parts by weight of glass fiber were mixed with 11 parts by weight of water addition to produce a material (10) of this embodiment. The shape and the composition of the glass fiber are shown in Table 12.

TABLE 12

| Length (mm) | Composition (%) | | | | | |
|---|---|---|---|---|---|---|
| | SiO$_2$ | K$_2$O + Na$_2$O | B$_2$O$_3$ | Al$_2$O$_3$ | MgO | CaO |
| 25 | 52.4 | 0.8 | 10.4 | 14.4 | 5.2 | 16.6 |

The material (10) was checked after the water curing of 7 days and after the firing of 3 hours at 500° C. respectively. No adverse change was observed.

EXAMPLE 9

79% by weight of normal portland cement, 20% by weight of amorphous silica flour and 1% by weight of alkylarylsulfonic acid sodium were mixed. 15 parts by weight of this mixture (8), 35 parts by weight of chammotte having the particle size of less than 5 mm and 5 parts by weight of the steel fiber were mixed along with 11 parts by weight of water addition to produce a material (11) of this embodiment. The material (11) was filled in a mold having the size of 1000×1000×300 mm to produce a block. The block was cured for 7 days at a room temperature to produce a premold product. Even after heating of 20 hours at 800° C., no crack was observed on the product.

THIRD EMBODIMENT

This embodiment relates to a hydraulic heat-resisting material which is characterized by including a volume stabilizing agent in the mixture and a premold product made of such heat-resisting material. This volume stabilizing agent improves the thermal property of the hydraulic cement used as the binder of the material, whereby the hydraulic heat-resisting material of this embodiment and a premold product made of such material can have high strength and high heat-resistance.

The material of this embodiment substantially consists of (i) 5 to 70 parts by weight of a mixture consisting of 36.4 to 87.5% by weight of hydraulic cement, 10.3 to 40.42% by weight of ultra-fine amorphous silica, 0.1 to 3% by weight of a dispersing agent and 2.1 to 20.21% by weight of a lime-containing volume stabilizing agent, and (ii) 95 to 30 parts by weight of a heat-resisting aggregate.

The reason for determining the amount of the volume stabilizing agent to 2.1 to 20.21% by weight is that when the amount is less than 2.1% by weight, the material decreases the volume stability thereof, while the amount exceeds 20.21% by weight, the material decreases the strength thereof.

With the exception of the addition of the volume stabilizing agent, the composition ratio of constituent materials of this invention is the same as those of the first embodiment.

Furthermore, the material or the premold product of the present embodiment also find their uses or applications in the iron and steel industry and other fields of industry. This embodiment is further explained in view of following examples.

EXAMPLE 10

64% by weight of normal portland cement, 27% by weight of the amorphous silica flour and 8% by weight of lime-containing agent (Onoda Expan, product of Onoda Cement Co., Ltd. used as a lime-containing volume stabilizer) and 1% by weight of "Mighty 100" (a dispersing agent of Kao Soap Co., Ltd.) were mixed. This mixture (9) and a heat-resisting aggregate (chammotte and fly ash) were mixed along with water addition to produce a material (10) of the present embodiment. The composition of the material (10) was shown in Table 13. A control (9) was prepared by using normal portland cement and a lime-containing volume stabilizing agent instead of the above mixture.

TABLE 13

| composition | material (10) (parts by weight) | control (9) (parts by weight) |
|---|---|---|
| chammotte (25-5 mm) | 50 | 50 |
| chammotte (1.2 mm) | 36 | 36 |
| fly ash | 4 | |
| mixture (9) | 10 | |
| normal portland cement | | 13 |
| volume stabilizing agent | | 1 |
| water | 11.6 | 11 |

The above material (10) and the control (9) were subjected to the measurement of the slump value, the free expansion rate, the compression strength. The result of the measurement is shown in Table 14.

TABLE 14

| | material (10) | control (9) |
|---|---|---|
| slump value (cm) | 10 | 10 |
| free expansion rate (× 10$^{-4}$) | 3.32 | 3.26 |
| compression strength (kg/cm$^2$) | | |
| at 20° C. × 14 days | 305 | 310 |
| at 110° C. × 20 hours | 370 | 265 |
| at 200° C. × 20 hours | 455 | 205 |
| at 300° C. × 20 hours | 515 | 145 |
| at 500° C. × 20 hours | 400 | 100 |

EXAMPLE 11

64% by weight of normal portland cement, 27% by weight of amorphous silica, 8% by weight of a lime-containing expanding agent (Onoda Expan, a product of Onoda Cement Co., Ltd.) and 1% by weight of "Mighty 100" (a dispersing agent of Kao Soap Co., Ltd.) were mixed. This mixture (10) was further mixed with water to produce a material (11) of this embodiment. The material (11) was casted in a mold having the size of 1000×1000×300 mm and a block removed from the mold was cured at a room temperature for 7 days to produce a premold product. This premold product was heated at 800° C. for 20 hours. No crack was observed on the product after heating.

FOURTH EMBODIMENT

This embodiment relates to a hydraulic heat-resisting material which is characterized by including a heat-insulating material and a premold product made of such heat-insulating material. The heat-insulating material improves the thermal property of the hydraulic cement used as a binder of the material of this embodiment, whereby the material and the premold product made of such materail can have high strength and high heat-resistance.

The material of this embodiment substantially consists of (i) 10 to 99 parts by weight of a mixture consisting of 50 to 95% by weight of hydraulic cement and 50 to 5% by weight of ultra-fine amorphous silica and (ii) 90 to 1 parts by weight of heat-insulating material.

However, the material may include 0.1 to 3% by weight of a dispersing agent in the mixture. Such dispersing agent improves the strength of the material and of the premold product made of the material while maintaining an improved heat-insulating effect of the material. The dispersing agent also can disperse the cement sufficiently with material in a condition of primary particulates, whereby the material can be produced inexpensively while assuring the sufficient strength to the material.

In the above composition of the material, following are considered as the heat-insulating material, namely, heat-insulating cracked brick, alumina balloon, lightweight chammotte, vermiculite, pearlite, silica balloon, ash balloon, glass balloon, "shirasu" balloon (volcanic ash), organic natural fiber, inorganic natural fiber, organic synthetic fiber, ceramic fiber, glass fiber, slag fiber, carbon fiber, silicon carbide fiber, artificial lightweight aggregate for light-weight concrete such as expanding shale, expanding clay, expanidng slate or fired fly ash, natural lightweight aggregate such as lapilli or processed product thereof, or light-weight aggregate produced as a by-product such as expanding slag.

As the dispersing agent, alkali metal salt or ammonium salt of alkylarylsulfonic acid, or alkali metal salt or ammonium salt of alkylarylsulfonic acid are considered.

Besides the above-mentioned hydraulic cement, ultra-fine amorphous silica, the dispersing agent and the heat-insulating material, the material of this embodiment may include a shrinkage restricting agent to provide an expanding effect or an exothermic material such as metal aluminium or metal silicon to improve the explosion resistance at drying.

The material of this embodiment can find the use or application thereof in the same industrial fields as those of the materials of the preceding embodiment.

EXAMPLE 12

85% by weight of normal portland cement and 15% by weight of amorphous silica were mixed. This mixture (11) and an aggregate (lightweight chammotte and vermiculite) and water were mixed to produce a material (12) of this embodiment. A control (10) was produced by replacing the mixture with aluminous cement.

The composition of the material (12) and the control (10) is shown in Table 16, while, in Table 15, the composition and the physical property of the above lightweight chammotte are shown.

TABLE 15

| Composition | | Physical property | |
|---|---|---|---|
| $SiO_2$ | 56 | refractoriness | SK 33 |
| $Al_2O_3$ | 37 | bulk density | 1.50 |
| $Fe_2O_3$ | 4 | apparent porosity (%) | 45 |
| $TiO_2$ | 1 | | |
| CaO | 0.3 | | |
| MgO | 0.2 | | |
| $Na_2O.K_2O$ | 0.5 | | |

TABLE 16

| | Material (12) | Control (10) |
|---|---|---|
| Lightweight chammotte (5~1 mm) | 15 (parts by weight) | 15 (parts by weight) |
| (1~0 mm) | 40 | 40 |

TABLE 16-continued

| Material (12) | | Control (10) |
|---|---|---|
| Vermiculite | 10 | 10 |
| Mixture (11) | 35 | — |
| Aluminous cement | — | 35 |
| Water | 45 | 45 |

The above material (12) and the control (10) were subjected to the measurement of the bending strength, the compression strength, the bulk specific density and the linear shrinkage.

The result of the embodiment is shown in Table 17.

TABLE 17

| | Material (12) | Control (10) |
|---|---|---|
| 110° C. × 24 hours | | |
| bulk density | 1.07 | 1.14 |
| bending strength ($kg/cm^2$) | 19.6 | 11.3 |
| compression strength ($kg/cm^2$) | 84 | 34 |
| linear shrinkage (%) | −0.14 | −0.13 |
| 600° C. × hours | | |
| bulk density | 1.04 | 1.11 |
| bending strength ($kg/cm^2$) | 12.8 | 8.2 |
| compression strength ($kg/cm^2$) | 54 | 28 |
| linear shrinkage (%) | −0.54 | −0.42 |
| 1000° C. × 3 hours | | |
| bulk density | 1.04 | 1.07 |
| bending strength ($kg/cm^2$) | 11.0 | 4.2 |
| compression strength ($kg/cm^2$) | 49 | 14 |
| linear shrinkage (%) | −0.86 | −0.56 |
| thermal conductivity (Kcal/m · hr · C.) | | |
| 600° C. × 3 hours | 0.162 | 0.204 |
| 1000° C. × 3 hours (by QTM of Showa Denko Co., Ltd.) | 0.179 | 0.213 |

EXAMPLE 13

80% by weight of normal portland cement, 18% by weight of amorphous silica and 2% by weight of "Mighty 100" (a dispersing agent of Kao Soap Co., Ltd.) were mixed. This mixture (12) and mesalite (an artificial lightweight aggregate for structural use) were mixed along with water to produce a material (13) of this embodiment.

The composition of the material (13) is shown in Table 18. As a control (11), a material which exclusively uses normal portland cement as the raw material was produced.

TABLE 18

| | Material (13) (parts by weight) | Control (11) (parts by weight) |
|---|---|---|
| Mesalite sand 20-5 (mm) | 40 | 40 |
| Mesalite gravel 2.5-0 (mm) | 30 | 30 |
| Mixture (12) | 30 | — |
| Normal portland cement | — | 30 |
| Water | 12 | 12 |

The appearance and the compression strength of the material (13) and the control (11) after a heat treatment are shown in Table 19.

TABLE 19

|  | Material (13) | Control (11) |
|---|---|---|
| Appearance | | |
| 110° C. × 20 hours | no crack | no crack |
| 300° C. × 20 hours | no crack | many fine cracks |
| 500° C. × 20 hours | no crack | many fine cracks |
| compression strength (Kg/cm$^2$) | | |
| strength after water curing for 14 days | 203 | 124 |
| 110° C. × 20 hours | 314 | 203 |
| 300° C. × 20 hours | 326 | 182 |
| 500° C. × 20 hours | 284 | 160 |

EXAMPLE 14

90% by weight of normal portland cement and 10% by weight of amorphous silica were mixed. This mixture (13), lightweight chammotte having the size of less than 5 mm and used as an aggregare and organic fiber were mixed along with the addition of water to produce a material (14) of this embodiment. The composition of the material (14) is shown in Table 21, while the composition and the physical property of the lightweight chammotte are shown in Table 20.

TABLE 20

| chemical composition | | physical property | |
|---|---|---|---|
| SiO$_2$ | 54 | refractoriness | SK 35 |
| Al$_2$O$_3$ | 43 | bulk density | 1.30 |
| Fe$_2$O$_3$ | 3 | | |
| TiO$_2$ | 0.1 | | |
| CaO | 0.1 | | |
| MgO | 0.3 | | |
| Na$_2$O.K$_2$O | 0.4 | | |

TABLE 21

|  | sample number | | | |
|---|---|---|---|---|
|  | 1 | 2 | 3 | 4 |
| lightweight chammotte 5–0 mm | 60 | 60 | 60 | 60 |
| mixture (13) | 40 | 40 | 40 | 40 |
| organic natural fiber | — | +1 | +2 | +3 |
| water | 31 | 40 | 52 | 58 |

The above materials were subjected to the measurement of the bulk density, the thermal conductivity, the bending strength and the compression strength. The result of the measurement is shown in Table 22.

TABLE 22

|  | sample number | | | |
|---|---|---|---|---|
|  | 1 | 2 | 3 | 4 |
| at 110° C. × 24 hours | | | | |
| bulk density | 1.58 | 1.37 | 1.22 | 1.13 |
| bending strength (kg/cm$^2$) | 38.1 | 28.9 | 21.0 | 17.2 |
| compression strength (kg/cm$^2$) | 147 | 109 | 84 | 67 |
| thermal conductivity (used QTM of Showa Denko Co., Ltd.) (Kcal/m · hr · ° C.) | 0.213 | 0.187 | 0.162 | 0.141 |

EXAMPLE 15

85% by weight of normal portland cement and the 15% by weight of amorphous silica were mixed. 35 parts by weight of this mixture (14), 55 parts by weight of light-weight chammotte and 10 parts by weight of vermiculite along with 45 parts by weight of water were mixed to produce a material (15) of this embodiment, lightweight chammotte and vermiculite being used as an aggregate. The material (15) was casted in a mold having the size of 1000×1000×300 mm to be formed into a block. This block was cured for 7 days at a room temperature to produce a premold product. No crack was observed on the premold product even after the heating thereof at 800° C. for 20 hours.

What we claim is:

1. Hydraulic heat-resisting material consisting essentially of (I) 5 to 70 parts by weight of a mixture, said mixture consisting of 36.4 to 87.5 percent by weight of hydraulic cement, 10.3 to 40.42 percent by weight of ultra-fine amorphous silica, 0.1 to 3 percent by weight of a dispersing agent, and 2.1 to 20.21 percent by weight of a lime-containing volume stabilizing agent, and (II) 95 to 30 parts by weight of a heat-resisting aggregate.

2. Premold product being made of hydraulic heat-resisting material consisting essentially of (I) 5 to 70 parts by weight of a mixture, said mixture consisting of 36.4 to 87.5 percent by weight of hydraulic cement, 10.3 to 40.42 percent by weight of ultra-fine amorphous silica, 0.1 to 3 percent by weight of a dispersing agent, and 2.1 to 20.21 percent by weight of a lime-containing volume stabilizing agent, and (II) 95 to 30 parts by weight of a heat-resisting aggregate.

* * * * *